US008549527B2

(12) United States Patent
Bagheri et al.

(10) Patent No.: US 8,549,527 B2
(45) Date of Patent: Oct. 1, 2013

(54) WORK PLAN PRIORITIZATION FOR APPLICATION DEVELOPMENT AND MAINTENANCE USING POOLED RESOURCES IN A FACTORY

(75) Inventors: Saeed Bagheri, Croton On Hudson, NY (US); Jarir K. Chaar, Tarrytown, NY (US); Yi-Min Chee, Yorktown Heights, NY (US); Krishna C. Ratakonda, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 402 days.

(21) Appl. No.: 12/862,904

(22) Filed: Aug. 25, 2010

(65) Prior Publication Data

US 2012/0054761 A1 Mar. 1, 2012

(51) Int. Cl.
*G06F 9/46* (2006.01)

(52) U.S. Cl.
USPC .............................. 718/103; 718/102; 718/104

(58) Field of Classification Search
None
See application file for complete search history.

(56) References Cited

U.S. PATENT DOCUMENTS

| | | | |
|---|---|---|---|
| 6,580,982 B2 | 6/2003 | Sinex | |
| 6,892,106 B2 | 5/2005 | Wu et al. | |
| 8,019,807 B2 * | 9/2011 | Connell et al. | 709/203 |
| 2005/0114860 A1 * | 5/2005 | Lin et al. | 718/100 |
| 2006/0101467 A1 * | 5/2006 | Buco et al. | 718/102 |
| 2008/0066070 A1 * | 3/2008 | Markov | 718/103 |
| 2008/0189334 A1 | 8/2008 | Mathur | |
| 2008/0244603 A1 * | 10/2008 | Bennington et al. | 718/104 |
| 2008/0256507 A1 * | 10/2008 | Chaar et al. | 717/101 |
| 2008/0263555 A1 * | 10/2008 | Ventroux et al. | 718/103 |
| 2009/0133027 A1 * | 5/2009 | Gunning et al. | 718/103 |
| 2009/0288090 A1 * | 11/2009 | Ujibashi et al. | 718/103 |
| 2010/0017252 A1 | 1/2010 | Chaar et al. | |
| 2010/0017782 A1 | 1/2010 | Chaar et al. | |
| 2010/0031226 A1 | 2/2010 | Chaar et al. | |
| 2010/0057514 A1 | 3/2010 | Chee et al. | |

OTHER PUBLICATIONS

B. Farzad et al., "A Priority-Based Model of Routing", pp. 1-10, Feb. 5, 2008.
L. Dipippo et al., "A Scheduling Service for a Dynamic Real-Time Corba System", pp. 1-6, 1996-1997.
V. M. Gonzalez et al., "Understanding and Supporting Personal Activity Management by It Service Workers", 2nd Symposium on Computer Human Interaction for Management of Information Technology, ACM Proc. of, pp. 1-10, 2008.
D. Carney et al., "Operator Scheduling in a Data Stream Manager", 29th International Conference on Very Large Data Bases, ACM Proc. of, 838-849, 2003.

\* cited by examiner

*Primary Examiner* — Jennifer To
*Assistant Examiner* — Tammy Lee
(74) *Attorney, Agent, or Firm* — John R. Pivnichny; Law Office of Jim Boice

(57) ABSTRACT

A computer implemented method, system and/or computer program product schedule execution of work requests through work plan prioritization. One or more work packets are mapped to and assigned to each work request from a group of work requests. A complexity level is derived for and assigned to each work packet, and priority levels of various work requests are determined for each entity from a group of entities. A global priority for the group of work requests is then determined. The global priority and the complexity levels combine to create a priority function, which is used to schedule execution of the work requests.

14 Claims, 7 Drawing Sheets

WORK PLAN PRIORITIZATION FOR APPLICATION DEVELOPMENT AND MAINTENANCE USING POOLED RESOURCES IN A FACTORY

BACKGROUND

The present disclosure relates to the field of computers, and specifically to the use of computers in prioritizing work plans. Still more particularly, the present disclosure relates to the use of computers in prioritizing work requests in a factory that uses pooled resources.

BRIEF SUMMARY

A computer implemented method, system and/or computer program product schedule execution of work requests through work plan prioritization. One or more work packets are mapped to and assigned to each work request from a group of work requests. A complexity level is derived for and assigned to each work packet, and priority levels of various work requests are determined for each entity from a group of entities. A global priority for the group of work requests is then determined. The global priority and the complexity levels combine to create a priority function, which is used to schedule execution of the work requests.

DETAILED DESCRIPTION

Figure 1:
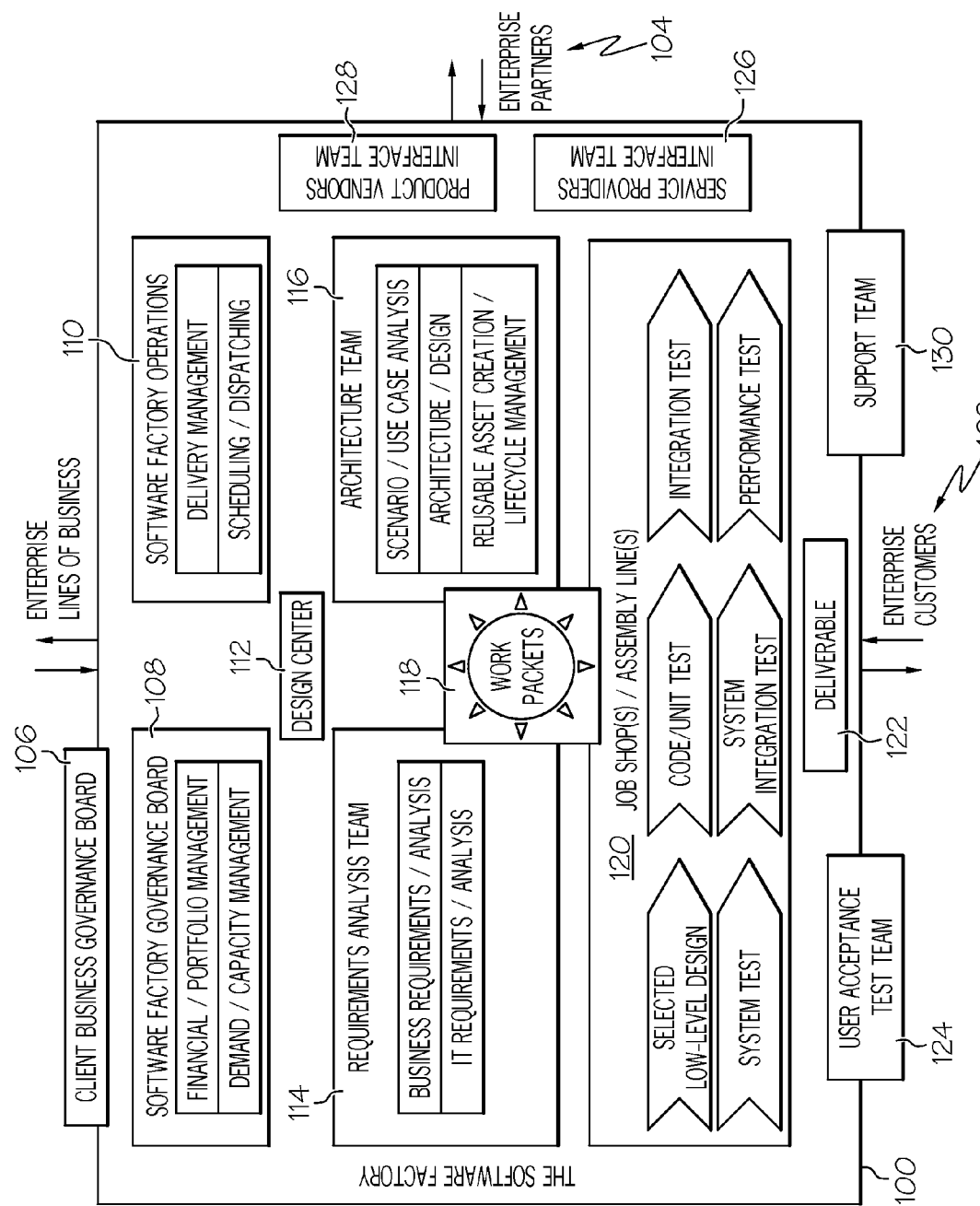
FIG. 1 is an overview of a software factory that may be used in one embodiment of the present disclosure.

As will be appreciated by one skilled in the art, some or all of the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some or all of the features described in the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

As described herein, one embodiment of the present disclosure relates to resource management and service planning, and more particularly to a method for generating optimum prioritization of work plans contingent upon multiple initial priority perspectives and finite availability of various resource and/or skills. Thus, the present disclosure relates to minimizing the tardiness of work request execution by considering priorities of multiple parties (e.g., a customer for a product, a manufacturer of the product, a broker of the product, etc.) as well as the complexity of the work requests.

One way to minimize the lateness of a work plan (e.g., work request) being executed is to formulate a priority function y* as:

$$y^* = \operatorname*{argmin}_{c_i(y) \geq 0} \sum_l w_l U(C(y_l) - D_l) \qquad \text{Formula (1)}$$

where $y_l$ is the decision vector for execution of each $l^{th}$ work item, C is the completion time, $D_l$ is the deadline of the $l^{th}$ work item, and $w_l$ is the weight or importance of $l^{th}$ work item. The function U( ) is the step function, and $c_i(y)$ is the $i^{th}$ optimization constraint that depends, among other things, on the details of the scheduling. In order to formulate Formula (1) in such a way that it is a "fair" representative of true objectives and constraints in real life factories, including software factories, the present disclosure modifies Formula (1) to create Formula (2), which is presented and discussed in detail below.

For any development project, there are many requirements (i.e., work requests), which are prioritized differently by customers, producers, and delivery organizations. Thus, a work request that has a top priority for a customer may have only secondary priority to a delivery organization. This variance in priorities can be due to different service level agreements (SLA) with individual clients/customers, the closeness of a deadline, the criticality of a deadline, etc. There can also be a limited set of resources to work on the project/product, which would affect the priority/urgency of a project from the perspective of a producer. In the context of a software factory (described below), each team can be working on multiple projects at the same time. Thus, the present disclosure presents a process for balancing the priority requirements across multiple projects and multiple entities.

Given a finite set of resources and competing customer schedules, the method described herein re-evaluates priority/urgency/requirements' priorities in order to reassign resources according to the overall/reconciled highest priority task. This prioritization happens before any scheduling/capacity management function and helps determine which deadlines and priorities should be used to determine resource assignment. This leads to the creation of an objective function that determines a main requirement's priority that reflects all stakeholder concerns. An optimization algorithm (see Formula (2) below) is used to determine the optimal priority that maximizes the objective function.

Table 1, shown below, shows a table of requirements, each of which relates to one or more work packets that need to be completed.

TABLE 1

| Work Packets Needed | | Priority | | |
|---|---|---|---|---|
| Req # | WP_Type (Complexity) | Customer | Factory | Delivery Org |
| R01 | WP1 (H), WP2 (L) | H | M | M |
| R02 | WP1 (H), WP3 (H) | M | M | L |
| R03 | WP2 (L) | M | H | M |

The first column in Table 1 identifies various work requests (RO1, RO2, RO3). The second column in Table 1 shows the type of work packets needed for a particular work request, and the level of complexity for each work packet. For example, work request RO1 is made up of two work packets: WP1 and WP2. Each work packet has been assigned a complexity level, based on an initial estimate for a duration of time, a number of resources, and resource skill requirements that will be required to complete a particular work packet. Thus, the two work packets that comprise RO1, WP1 and WP2, have respective complexity ratings of high (H) and low (L).

The remaining columns in Table 1 show priorities assigned to the work request by different stakeholders, such a customer (i.e., an entity who has ordered a product), a factory (i.e., an entity that will be producing the product), and a delivery organization (i.e., an entity that will broker and/or deliver the finished product to the customer). Thus, a work request that is of high priority to a customer (e.g., RO1) may only be of medium priority to the factory and delivery organization if there is no service level agreement (SLA) penalty associated with that work request for the factory and/or delivery organization. Furthermore, a medium priority work request (ticket) for the delivery organization (e.g., RO3) could be a high priority ticket for the factory since the required skills will be unavailable shortly.

One embodiment of the present disclosure incorporates a priority function into Formula (1), resulting in Formula (2):

$$y^* = \underset{c_i(y) \geq 0}{\operatorname{argmin}} \sum_l W(y_l, p_l, s_l) U(C(y_l) - D_l) \qquad \text{Formula (2)}$$

In Formula (2), W( ) represents the priority function, $p_l$ is a set of weight factor perspectives or priority perspectives (e.g., from a customer, factory, etc.) for $l^{th}$ work items, and $s_l$ is a set of skills required for execution of $l^{th}$ work items. Using various choices of priority functions, a balance of a true priority of each work item (work request, packet), W( ) represents the priority function, $p_l$ is a set of weight factor perspectives or priority perspectives (e.g. from client, factory, etc.) for $l^{th}$ work item, and $s_l$ is a set of skills required for execution of $l^{th}$ work item. That is, using various choices for factors in Formula (2), a priority function balances the true priority of a work request based on the inputs/factors shown in the formula.

In one embodiment of the present disclosure, a software factory is utilized as a producer of a product that is created by executing one or more work requests, where each work request is made up of one or more work packets. A software factory establishes a disciplined approach to leveraging global resources for application development and maintenance activities. As described herein, resources with similar skills are pooled by functional area(s) and geographically organized into assembly centers. Resources in an assembly center may have skills that enable them to work in other functional areas/move to other assembly centers. A resource allocated to multiple functional areas has a primary functional area. In the present disclosure, attention is paid to managing the allocation of resources to primary functional areas by taking into account both short term and long term consequences.

Described below is a software factory, which includes a collection of business and Information Technology (IT) governance models, operational models, delivery methods, metrics, environment and tools bundled together to improve the quality of delivered software systems, control cost overruns, and effect timely delivery of such systems. The software factory described herein offers a practical solution to developing software systems using multiple sites that are geographically distributed. The issues of varying time zones and the hand-over between various teams residing in such time zones are handled by exchanging work packets. A work packet is a self-contained work unit that is composed of processes, roles, activities, applications and the necessary input parameters that allow a team to conduct a development activity in a formalized manner with visibility to progress of their effort afforded to the requesting teams.

The software factory described herein is a uniquely engineered scalable efficiency model construct that transforms a traditional software development art form into a repeatable scientific managed engineered streamline information supply chain. The software factory incorporates applied system and industrial engineering quality assured efficiencies that provide for the waste eliminating, highly optimized performed instrumentation, measured monitoring and risk mitigated management of software development.

Software Factory Overview

With reference now to the figures, and in particular to FIG. 1, an overview of a preferred embodiment of a software factory 100 is presented. As depicted, the software factory 100 is a service that interacts with both enterprise customers (i.e., client customers) 102 as well as enterprise partners (i.e., third party vendors) 104. The primary human interface with the enterprise customers 102 is through a Client Business Governance Board (CBGB) 106. CBGB 106 represents client stakeholders and client business sponsors that fund a project of the software factory 100. CBGB 106 can be an internal or external client. That is, the same enterprise (i.e., internal client) may include both CBGB 106 and software factory 100, or a first enterprise (i.e., external client) may have CBGB 106 while a second enterprise has the software factory 100. As described in greater detail below, a project proposal definition is then run through a software factory induction process in a Software Factory Governance Board (SFGB) 108 and Software Factory Operations (SFO) 110, where the project proposal definition is evaluated, qualified, scored and categorized. The project proposal definition is then subject to a System Engineering Conceptual Requirements Review by the SFGB 108. Based on the outcome of the review by the SFGB 108, a decision is made to accept the project proposal definition or to send it back to the CBGB 106 for remediation and resubmission through the Software Factory Induction Process.

Thus, Software Factory Governance, which includes SFGB 108 and SFO 110, provides the guidance, constraints, and underlying enforcement of all the factory policies and procedures, in support of their governing principles in support of the strategic objects of the Software Factory 100. Software Factory governance consists of factory business, IT and operations governance. The principles, policies and procedures of these models are carried out by two governing bodies—the Business Governance Board and the IT Governance Board (both part of SFGB 108), and an enforcement body—the Software Factory Operations 110.

Thus, Software Factory Governance is responsible for:
Business and IT strategic planning;
Assuring that Business and IT strategies are aligned;
Setting Goals;
Monitoring those goals;
Detecting problems in achieving those goals;
Analyzing Problems;
Identifying Reasons;
Taking Action;
Providing Feedback; and
Re-Strategizing (Continue process improvement).

As soon as a project is deemed worthy to proceed, the job of creating the custom software is sent to a Design Center 112, where the project is broken into major functional areas, including those handled by a Requirements Analysis Team 114 and an Architectural Team 116.

The Requirements Analysis Team 114 handles the Requirement Management side of the Design Center 112, and is responsible for collecting the business requirements from the lines of business and populating these requirements into the tools. Analysis of business requirements is also carried out in order to derive associated IT requirements. Some requirements (e.g. system requirements) may have a contractual constraint to use a certain infrastructure. Requirements are analyzed and used in the basis for business modeling. These requirements and representative business (contextual, event and process models) are then verified with and signed off from project stakeholders. Requirements are then base-lined and managed within release and version control.

The Architectural Side of the Design Center 112 is handled by the Architecture Team 116, which takes the output of the requirement/analysis/management side of the design center, and uses architectural decision factors (functional requirements, non-functional requirements, available technology, and constraints), to model a design with appropriate example representation into detail design specification, that is bundled with other pertinent factors into a work packet for assembly lines to execute.

Work Packets 118 are reusable, self-contained, discrete units of software code that constitute a contractual agreement that governs the relationship among Design Center 112, Software Factory Governance Board 108, Software Factory Operations 110, and Assembly Line 120. That is, each work packet 118 includes governance policies and procedures (e.g., including instructions for how work reports are generated and communicated to the client), standards (e.g., protocol for the work packet 118), reused assets (e.g., reusable blocks of code, including the requirements, instructions and/or links/pointers associated with those reusable blocks of code), work packet instructions (e.g., instructions for executing the work packet 118), integration strategy (e.g., how to integrate the work packet 118 into a client's security system), schedule (e.g., when deliverables are delivered to the client), exit criteria (e.g., a checklist for returning the work packet 118 and/or deliverables to the software factory 100), and Input/Output (I/O) work products (e.g., artifact checklist templates for I/O routines).

Assembly Line(s) 120 which are part of a Job Shop, include, but are not limited to any team that is initialized, skilled and certified to accept application factory work packets from the factory Design Center 112. Job Shops receive and execute the work packets 118, which are specified by the Design Center 112, to create a customized deliverable 122. As shown in exemplary manner, the assembly line 120 puts the work packets 118 into a selected low-level design to generate a deliverable (executable product). While assembly line 120 can be a manual operation in which a coding person assembles and tests work packets, in another embodiment this process is automated using software that recognizes project types, and automatically assembles work packets needed for a recognized project type.

Various tests can be performed in the assembly line 120, including code/unit tests, integration test, system test, system integration test, and performance test. "Code/unit test" tests the deliverable for stand-alone bugs. "Integration test" tests the deliverable for compatibility with the client's system. "System test" checks the client's system to ensure that it is operating properly. "System integration test" tests for bugs that may arise when the deliverable is integrated into the client's system. "Performance test" tests the deliverable as it is executing in the client's system. Note that if the deliverable is being executed on a service provider's system, then all tests described are obviously performed on the service provider's system rather than the client's system.

A User Acceptance Test Team 124 includes a client stakeholder that is charged with the responsibility of approving acceptance of deliverable 122.

Software factory 100 may utilize enterprise partners 104 to provide human, hardware or software support in the generation, delivery and/or support of deliverables 122. Such third party contractors are viewed as a resource extension of the software factory 100, and are governed under the same guidelines described above.

If an enterprise partner 104 is involved in the generation of work packets 118 and/or deliverables 122, an interface between the software factory 100 and the enterprise partner 104 may be provided by a service provider's interface team 126 and/or a product vendor's interface team 128. Service provided by an enterprise partner 104 may be a constraint that is part of contractual agreement with a client to provide specialized services. An example of such a constraint is a required integrated information service component that is referenced in the integration design portion of the work packet 118 that is sent to assembly line 120. Again, note that third party service providers use a standard integration strategy that is defined by the software factory 100, and, as such, are subject to and obligated to operate under software factory governance.

Product vendor's interface team 128 provides an interface with a Product Vendor, which is an enterprise partner 104 that provides software factory 100 with supported products that maybe used within a software factory solution. Product Vendors are also responsible for providing product support and maintaining vendor's relationships, which are managed under the software factory's governance guidelines.

Support Team 130 includes both Level 2 (L2) support and Level 1 (L1) support.

L2 Support is provided primarily by Software Engineers, who provide problem support of Software Factory produced delivered code for customers. That is, if a deliverable 122 doesn't run as designed, then the software engineers will troubleshoot the problem until it is fixed. These software engineers deliver technical assistance to Software Factory customers with information, tools, and fixes to prevent known software (and possibly hardware) problems, and provide timely responses to customer inquiries and resolutions to customer problems.

L1 support is primarily provided by an L1 Help Desk (Call Center). L1 Help Desk support can be done via self-service voice recognition and voice response, or by text chat to an automated smart attendant, or a call can be directed to a Customer Service Representative (CSR). Customer Service Representatives in this role provide first line of help problem support of Software Factory produced deliverables. Such help includes user instruction of known factory solution procedures. For any related customers issues that cannot be resolved through L1, the L1 Help Desk will provide preliminary problem identification and create trouble ticket entry into trouble tracking system, which then triggers a workflow event to dynamically route the problem issue to an available and appropriate L2 support group queue.

Figure 2:
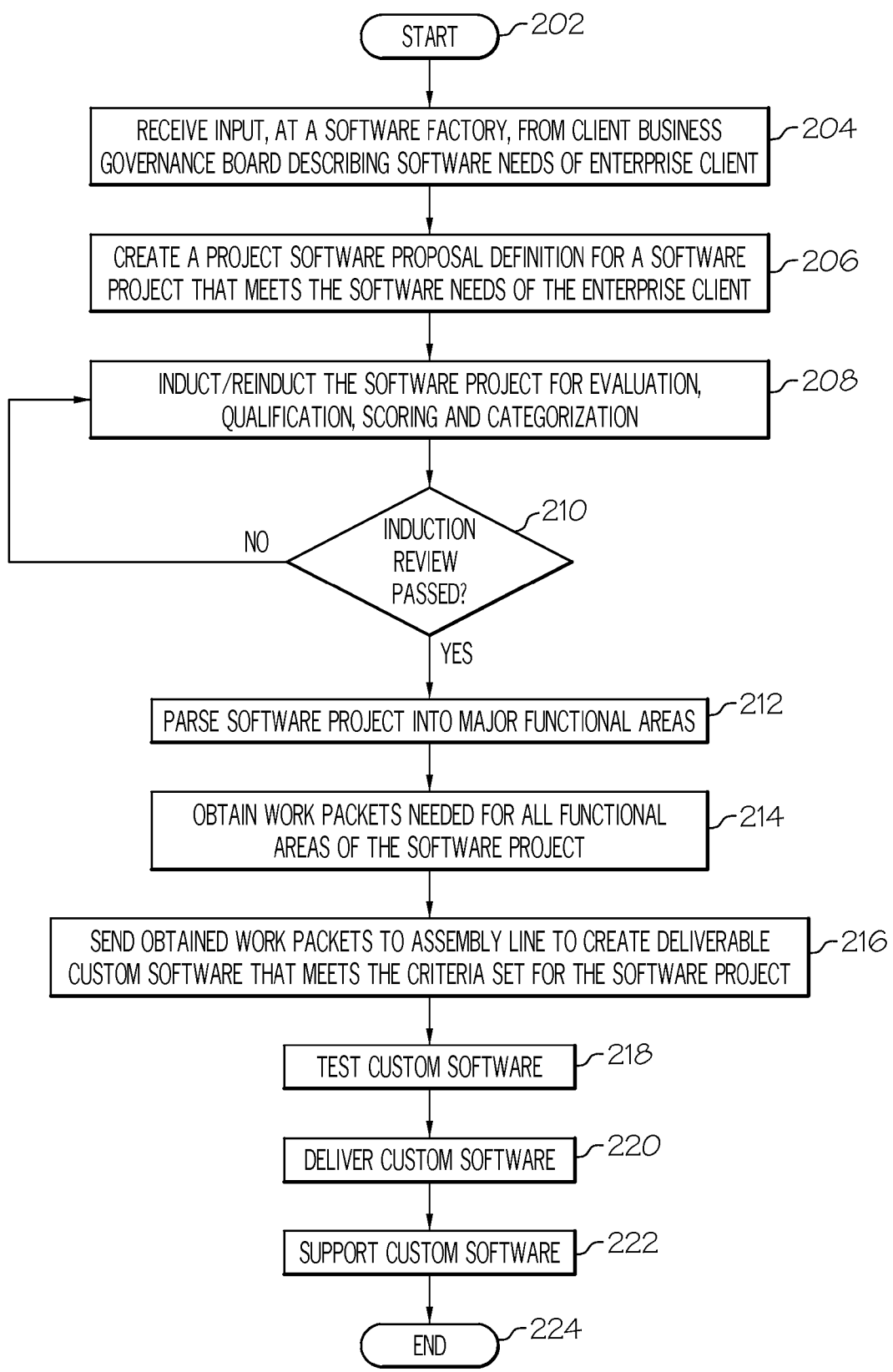
FIG. 2 is a flow-chart of steps taken to create custom software through the use of work packets in a software factory.

With reference now to FIG. 2, a flow-chart of exemplary steps taken to create custom software through the use of a software factory is presented. After initiator block 202, which may be a creation of a contract between an enterprise client and a software factory service, input, from a Client Business Governance Board, is received at a software factory (block 204). This input is a detailed description of the custom software needs of the enterprise client. While such input is usually prepared and presented by human management of the enterprise client, alternatively this input may be the creation of a Unified Modeling Language (UML) based description of the needed software. Based on the client's input, a project software proposal definition is created by the Software Factory Governance Board of the software factory (block 206). This project software proposal definition is sent to the scheduling/dispatching department of the Software Factory Operations, which creates a software project.

The software project is then inducted (block 208). As will be described in more detail below, the project induction provides an initial introduction of the project to the software factory. Through the use of various parameters, including those found in records of other projects, checklists, et al., the project is initially evaluated. This evaluation includes determining if the software factory has the capacity, resources, bandwidth, etc. needed for the project. If so, then a determination is made as to whether the project is qualified for acceptance by the software factory. Such qualification includes, but is not limited to, determining if the project falls within the guidelines set by a Service Level Agreement (SLA) between the client enterprise and the software factory, whether the project conforms to legal guidelines such as Sarbanes-Oxley, etc. Based on these and other criteria, the project is scored for feasibility, profitability, and desirability for implementation. If the induction process concludes that the project should proceed, then it is categorized into a particular type of project (e.g., payroll, inventory control, database management, marketing, et al.).

If the induction process does not pass (query block 210), indicating that the project should not proceed, then the project is returned to the Client Business Governance Board for additional discussions between the Client Business Governance Board and the software factory, in order to induct a revised project (i.e., reinduct the software project). However, if the induction process passes, then the software project is parsed into major functional areas (block 212). That is, the project is divided up ("broken apart") in order to establish subunits that can later be integrated into a single custom software ("deliverable").

Work packets are then obtained for all of the functional areas of the software project (block 214). These work packets are reusable components which are described in detail below. The work packets are then stitched together (block 216) on an assembly line to create deliverable custom software that meets the criteria for the software project that has been established in the earlier steps. The custom software is then tested in the software factory (block 218). Once testing is completed, the custom software is delivered (block 220) to the client customer, who receives on-going support from the support team (block 222). The flow-chart ends at terminator block 224.

While the process has been described for the creation of custom software, the same process is used by a software factory for other activities, including creating a service for a customer, creating standardized software, etc. Thus, the software factory uses work packets to blend software (including reusable artifacts), protocols (e.g., how software will be transmitted, how individuals will be contacted, etc.), governance requirements (e.g., service level agreements that describe how much a service will cost) and operating environments (hardware and software, including operating systems, integrated environments such as SAP™, Rational™, etc.) into a single integrated product, which can then be used in a stand-alone manner or can be fed into another system/product.

Note that software factory 100 may be virtual. That is, the different components (e.g., software factory governance board 108, software factory operations 110, design center 112, assembly line 120) may be located in different locations, and may operate independently under the control of information found in work packets 118. In a preferred embodiment, each of the different components of the software factory 100 publishes a set of services that the component can provide and a set of requirements for using these services. These services are functions that are well defined and made visible for outside entities to call.

For example, assume that assembly line 120 publishes a service that it can assemble only work packets that include code and protocol that utilize IBM's Rational™ software development platform. Thus, the assembly line 120 has published its service (set of services includes "assembling work packets") and the required protocol (set of requirements includes "utilize IBM's Rational™ software development platform") to the design center 112, which must decide if it wants (or is able) to utilize that particular assembly line 120. If not, then another assembly line from another software factory may be called upon by the design center 112. Behind each offered service are the actual processes that a component performs. These processes are steps taken by the service. Each step is performed by a section of software, or may be performed by an individual who has been assigned the task of performing this step. Each step utilizes leveraged tools, including the work packets 118 described herein. These work packets 118 then implement the process.

By utilizing published interfaces between the different components of the software factory 100, then different components from different software factories can be interchanged according to the capability offered by and protocol used by each component. This enables a "building block" architecture to be implemented through the use of different components from different software factories.

Life Cycle of a Work Packet

Figure 3:
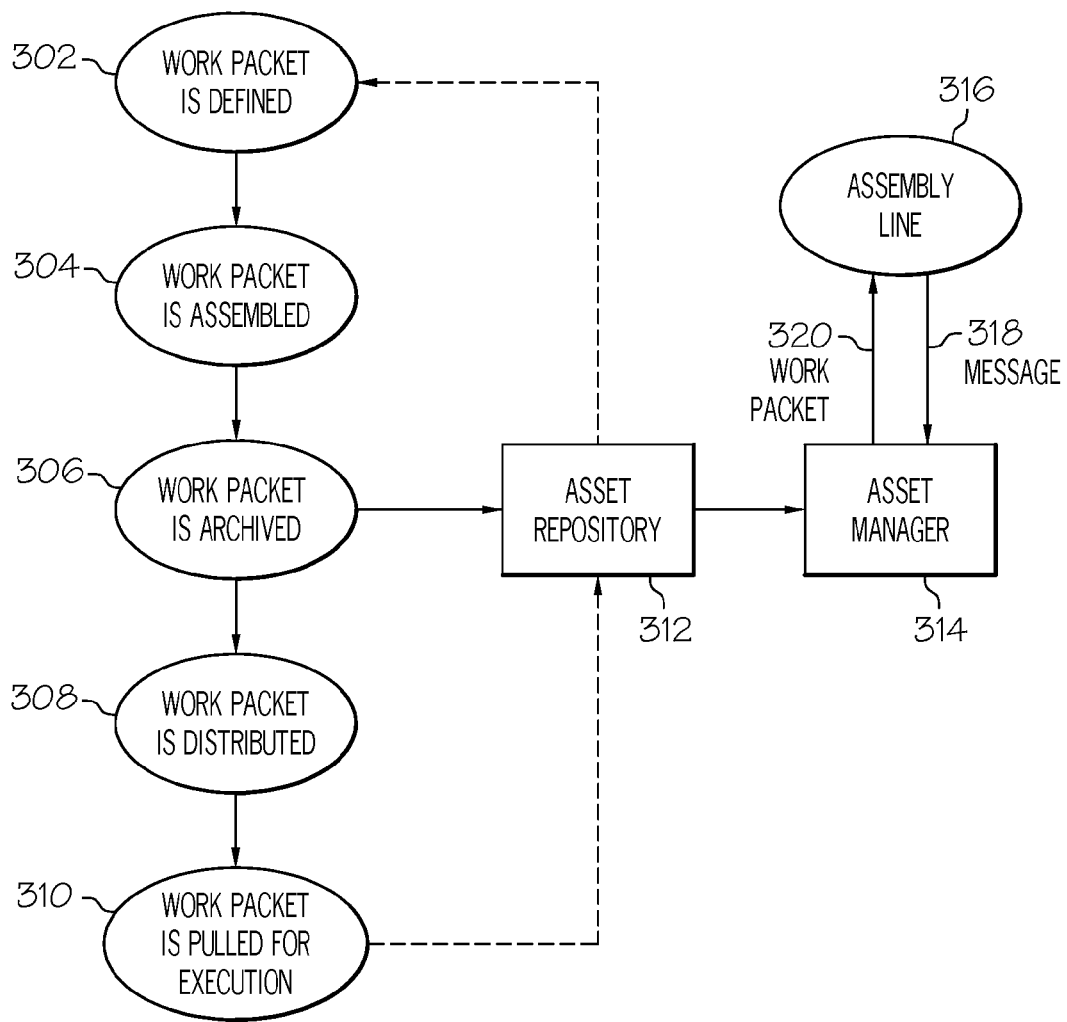
FIG. 3 presents an overview of the life cycle of work packets.

There are five phases in the life cycle of a work packet, which are shown in FIG. 3. These five phases are 1) Defining (block 302); 2) Assembling (block 304); Archiving (block 306); Distributing (block 308); and Pulling for Execution (block 310). As indicated by the top dashed line coming out of asset repository 312, this life cycle may be recursive. That is, in one embodiment, work packets are modified and upgraded in a recursive manner, which includes the steps shown in FIG. 3. Once a work packet is assembled and archived, it is stored in an asset repository 312, whence the work packet may be accessed and utilized by an asset manager 314 for assembly into a deliverable by an assembly line 316. Note that the assembly line 316 can also send, to the asset manager 314, a message 318 that requests a particular work packet 320, which can be pulled (block 310) into the asset repository 312 by the asset manager 314. This pulling step (block 310), is performed through intelligent routing distribution (block 308) to the asset repository 312 and assembly line 316. The configuration of the routing distribution of the work packet 320 is managed by the asset manager 314, which is software that indexes, stores and retrieves assets created and used with the software factory.

Work Packet Components

A work packet is a self-contained work unit that comprises processes, roles, activities (parts of the job), applications, and necessary input parameters that allow a team to conduct a development activity in a formalized manner, with visibility to progress of their effort afforded to requesting teams. A work packet is NOT a deliverable software product, but rather is a component of a deliverable software product. That is, a work packet is processed (integrated into a system, tested, etc.) to create one or more deliverables. Deliverables, which were created from one or more work packets, are then combined into a custom software, such as an application, service or system.

In a preferred embodiment, a work packet is composed of the following eight components:

Governance Policies and Procedures—these policies and procedures include protocol definitions derived from a project plan. That is, a project plan for a particular custom software describes how work packets are called, as well as how work packets report back to the calling plan.

Standards—this component describes details about how work packets are implemented into a deliverable in a standardized manner Examples of such standards are naming conventions, formatting protocol, etc.

Reused Assets—this component includes actual code, or at least pointers to code, that is archived for reuse by different assembled deliverables.

Work Packet Instructions—this component describes detailed instructions regarding how a work packet is actually executed. That is, work packet instructions document what work packets need to be built, and how to build them. These instructions include a description of the requirements that need to be met, including design protocols, code formats, and test parameters.

Integration Strategy—this component describes how a set of work packets, as well as deliverables developed from a set of work packets, are able to be integrated into a client's system. This component includes instructions regarding what processes must be taken by the client's system to be prepared to run the deliverable, as well as security protocols that must be followed by the deliverable. The component may also include a description of how one deliverable will interact with other applications that are resident to the client's computer system.

Scheduling—this component describes when a set of work packets are to be sent to an assembly line, plus instructions on monitoring the progress and status of the creation of the work packet.

Exit Criteria—this component includes instructions (e.g., through the use of a checklist) for deploying a deliverable to the client's system. That is, this component is the quality criteria that the deliverable must meet before it can be considered completed and acceptable for a project.

Input Work Products—this component includes Input/Output (I/O) templates that are used to describe specific work products that are needed to execute the activities of the work packet (in the assembly line) to build the deliverable.

Defining a Work Packet

The process of defining a work packet is called a "work packet definition process." This process combines critical references from governance, factory operations (e.g., factory management, project management), business criteria, and design (including test) artifacts. Structured templates enable governance, design center, and factory operations to define the referenced artifacts by filling in corresponding functional domain templates, thus defining the contents of the work packet. Thus, a work packet includes not only reusable software code, but also includes governance and operation instructions. For example, a work packet may include directions that describe a sequence of steps to be taken in a project; which data is to be used in the project; which individuals/departments/job descriptions are to perform each step in the project; how assigned individuals/departments are to be notified of their duties and what steps/data are to be taken and used, et al. Thus, each work packet includes traceability regarding the status of a job, as well as code/data/individuals to be used in the execution of a project.

Thus, work packets are created from unique references to governance, factory operations (factory mgt, project mgt), business, and design (including test) artifacts. The packet definition process provides structure templates that enable governance, design center, and factory operations to define referenced artifacts (newly defined artifact identifiers or any reusable part of existing work packet definitions), by filling in corresponding functional domain (e.g., eXtensible Markup Language—XML) templates. What can be defined may be controlled by a Document Type Definition (DTD). The DTD states what tags and attributes are used to describe content in the deliverable, including where each XML tag is allowed and which XML tags can appear within the deliverable. XML tag values are defined and applied to a newly defined XML template for each functional area of a design center. These XML templates are then merged into one hierarchical structure when later assembled into finalized work packets.

Figure 4:
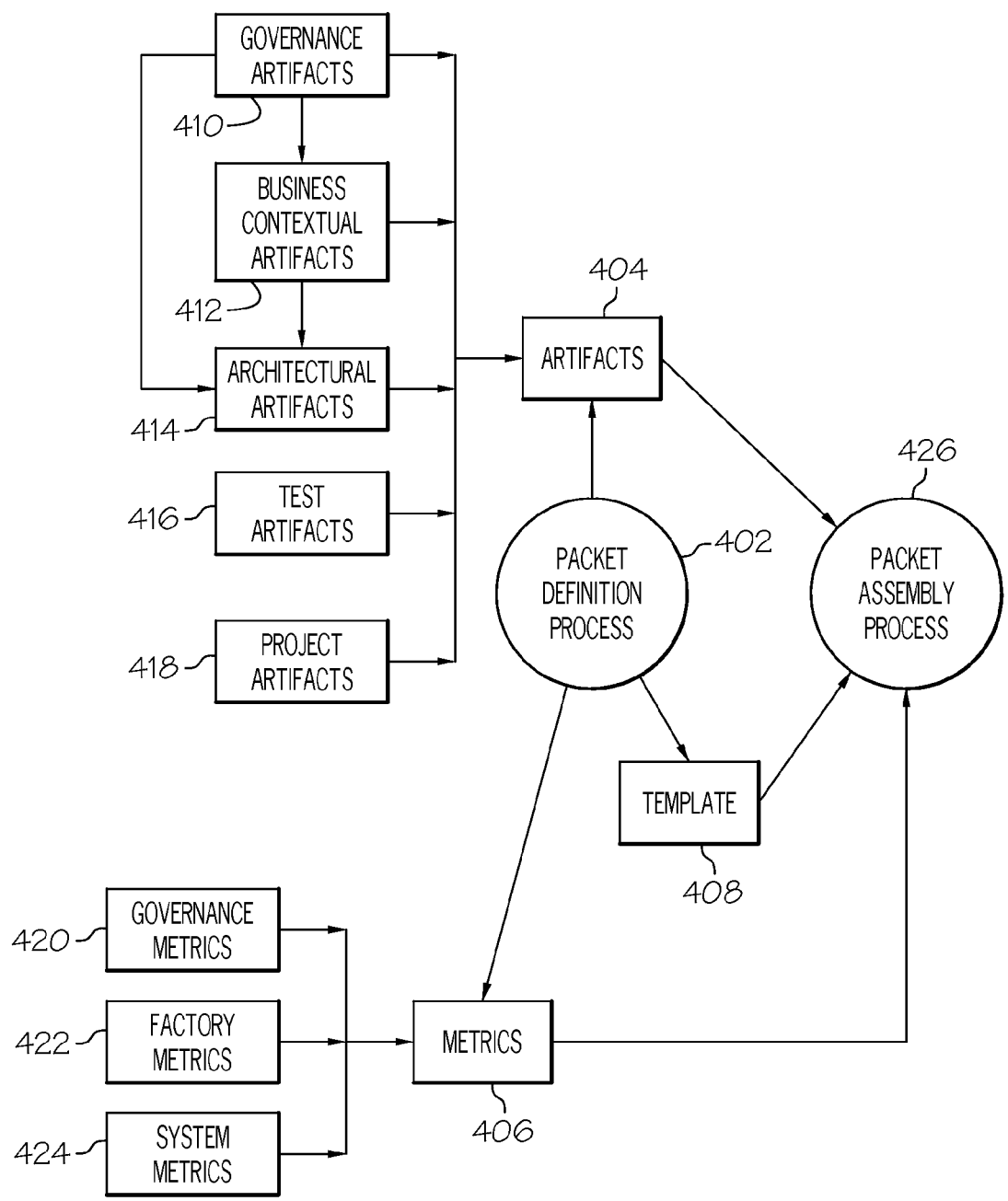
FIG. 4 presents an overview of an environment in which work packets are defined and assembled.

With reference now to FIG. 4, an overview of the environment in which a packet definition process 402 occurs is presented. The packet definition process 402 calls artifacts 404, metrics 406, and a template 408 to define a work packet. The artifacts may be one or more of: governance artifacts 410 (intellectual property assets produced in the software factory by the Software Factory Governance Board 108 described in FIG. 1); business contextual artifacts 412 (intellectual property assets produced in the software factory by business analysts in the requirement analysis team 114 described in FIG. 1); architectural artifacts 414 (intellectual property assets produced by the architecture team 116 described in FIG. 1); test artifacts 416 (intellectual property assets produced by test architects in the architecture team 116 shown in FIG. 1); and project artifacts 418 (intellectual property assets produced in the software factory by system engineers in the design center 112 shown in FIG. 1).

The metrics 406 may be one or more of: governance metrics 420 (measurable governance indicators, such as business plans); factory metrics 422 (measurable indicators that describe the capabilities of the software factory, including assembly line capacity); and system metrics 424 (measurable indicators that describe the capabilities of the client's computer system on which deliverables are to be run).

Based on a template 408 for a particular deliverable, artifacts 404 and metrics 406 are used by a packet assembly process 426 to assemble one or more work packets.

Assembling a Work Packet

Template 408, shown in FIG. 4, describes how a work packet is to be assembled. The template 408 includes meta-data references to key artifacts 404 and metrics 406, which are merged into a formal work packet definition as described above. The work packet is then assembled in a standardized hierarchical way and packaged within a factory message envelope that contains a header and body.

Figure 5:
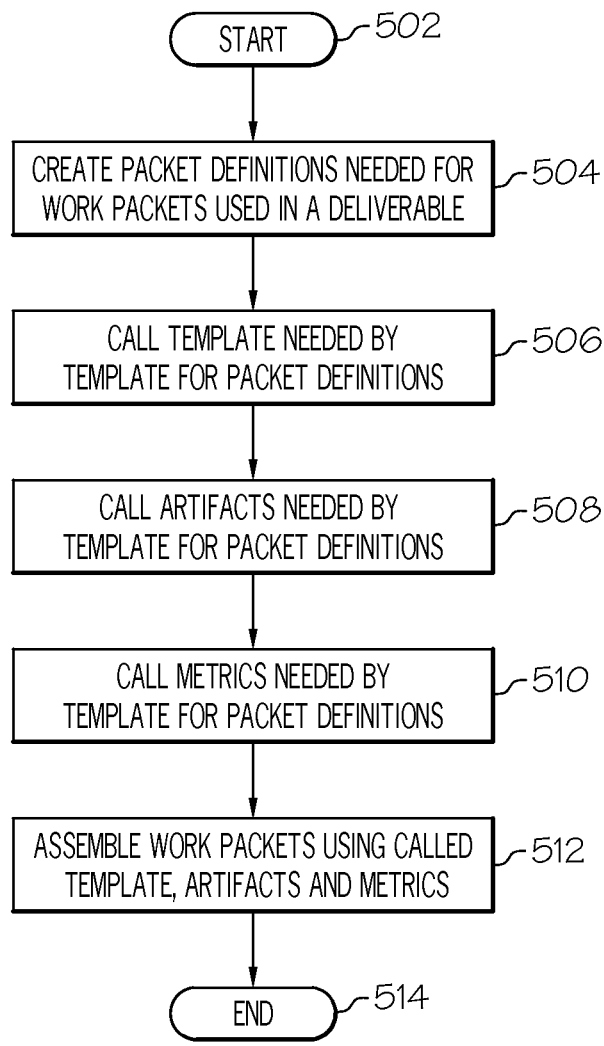
FIG. 5 is a high-level flow-chart of steps taken to define and assemble work packets.

With reference now to FIG. 5, a high-level flow-chart of steps taken to define and assemble work packets is presented. After initiator block 502 (which may be an order by the Requirements Analysis Team 114 to the Architecture Team 116, shown in FIG. 1, to create a design center-defined work packet), the requisite packet definitions are created for work packets that are to be used in deliverables (block 504). First, a template, which preferably is a reusable that has been used in the past to create the type of work packet needed, is called (block 506). Based on that called template, the needed artifacts (block 508) and metrics (block 510) are called. Using the template as a guide, the called artifacts and metrics are assembled in the requisite work packets (block 512), and the process ends.

Figure 6:
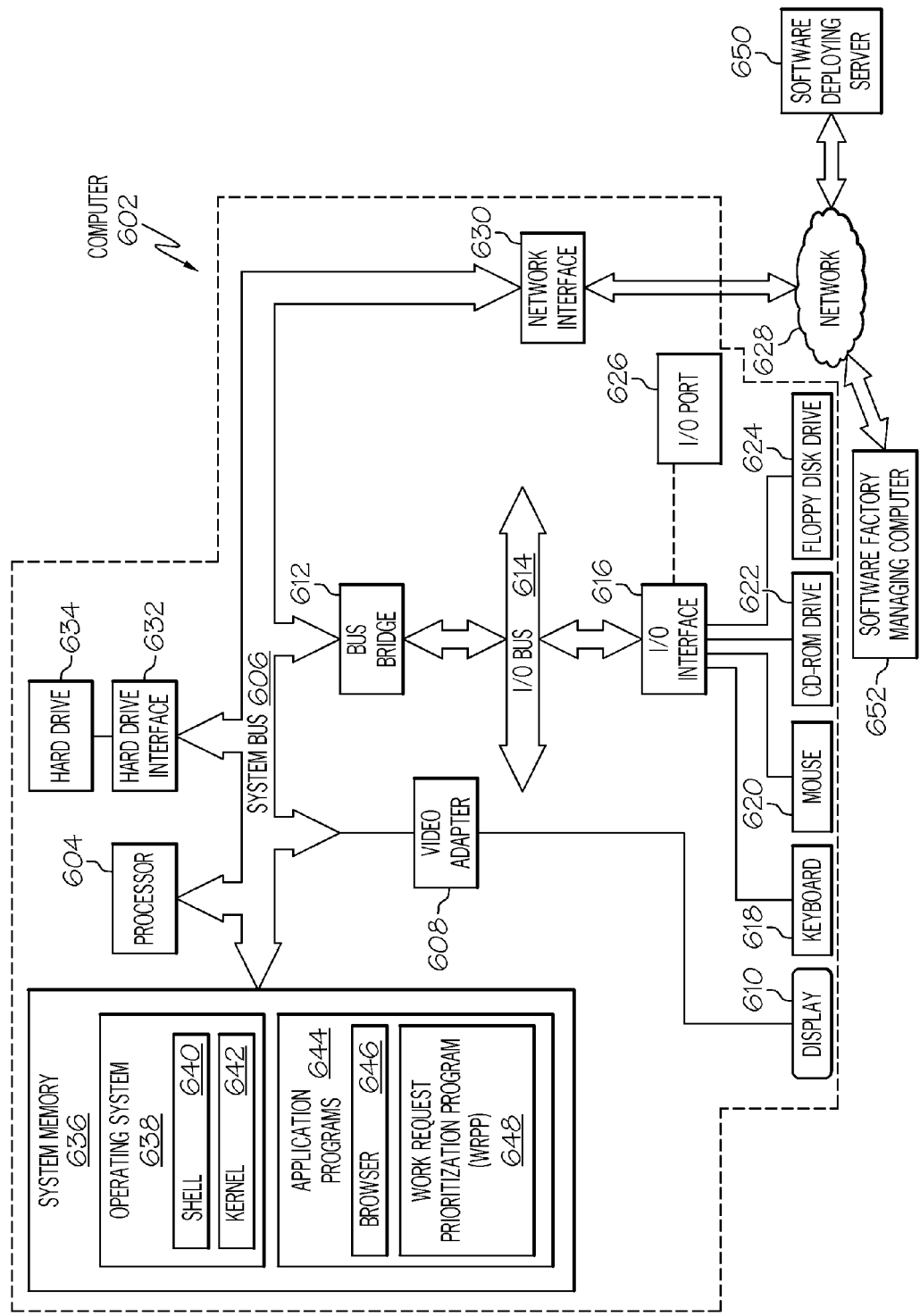
FIG. 6 illustrates an exemplary computer in which the present invention may be utilized.

With reference now to the figures, and in particular to FIG. 6, there is depicted a block diagram of an exemplary computer 602, which may be utilized by the present disclosure. Computer 602 includes a processor unit 604 that is coupled to a system bus 606. Processor unit 604 may utilize one or more processors, each of which has one or more processor cores. A video adapter 608, which drives/supports a display 610, is also coupled to system bus 606. System bus 606 is coupled via a bus bridge 612 to an input/output (I/O) bus 614. An I/O interface 616 is coupled to I/O bus 614. I/O interface 616 affords communication with various I/O devices, including a keyboard 618, a mouse 620, a media tray 622 (which may include storage devices such as CD-ROM drives, multi-media interfaces, etc.), a floppy disk drive 624, and an input/output (I/O) port 626. While the format of the ports (including I/O port 626) connected to I/O interface 616 may be any known to those skilled in the art of computer architecture, in a preferred embodiment some or all of these ports are universal serial bus (USB) ports. Note that some or all of the architecture depicted for computer 602 may be utilized by software deploying computer 650 and/or software factory managing computer 652.

As depicted, in one embodiment, computer 602 is optionally able to communicate via network 628 using a network interface 630. Network 628 may be an external network such as the Internet, or an internal network such as an Ethernet or a virtual private network (VPN).

A hard drive interface 632 is also coupled to system bus 606. Hard drive interface 632 interfaces with a hard drive 634. In a preferred embodiment, hard drive 634 populates a system memory 636, which is also coupled to system bus 606. System memory is defined as a lowest level of volatile memory in computer 602. This volatile memory includes additional higher levels of volatile memory (not shown), including, but not limited to, cache memory, registers and buffers. Data that populates system memory 636 includes computer 602's operating system (OS) 638 and application programs 644.

OS 638 includes a shell 640, for providing transparent user access to resources such as application programs 644. Generally, shell 640 is a program that provides an interpreter and an interface between the user and the operating system. More specifically, shell 640 executes commands that are entered into a command line user interface or from a file. Thus, shell 640, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 642) for processing. Note that while shell 640 is a text-based, line-oriented user interface, the present disclosure will equally well support other user interface modes, such as graphical, voice, gestural, etc.

As depicted, OS 638 also includes kernel 642, which includes lower levels of functionality for OS 638, including providing essential services required by other parts of OS 638 and application programs 644, including memory management, process and task management, disk management, and mouse and keyboard management.

Application programs 644 include a renderer, shown in exemplary manner as a browser 646. Browser 646 includes program modules and instructions enabling a world wide web (WWW) client (i.e., computer 602) to send and receive network messages to the Internet using hypertext transfer protocol (HTTP) messaging, thus enabling communication with software deploying server 650 and other described computer systems.

Application programs 644 also include a work request prioritization program (WRPP) 648, which, when executed, performs some or all of the processes described in FIGS. 1-5 and 7. In one embodiment, WRPP 648 is downloadable from software deploying server 650 in an on-demand basis, such that units of code are downloaded only when needed. In another embodiment, some or all of the processes executed by WRPP 648 are performed by software deploying server 650 itself, thus minimizing the use of resources within computer 602.

Software factory managing computer 652 is dedicated to managing a software factory (e.g., as depicted in FIG. 1). Similarly, software factory managing computer 652 may be affiliated with one or more particular work areas (e.g., a workstation in an assembly line) within a software factory. In another embodiment, software factory management computer 652 controls the assignment, execution, and work flow of work requests and/or work packets through a traditional factory that manufactures physical (i.e., non-software) objects/products.

The hardware elements depicted in computer 602 are not intended to be exhaustive, but rather are representative to highlight essential components required by the present disclosure. For instance, computer 602 may include alternate memory storage devices such as magnetic cassettes, digital versatile disks (DVDs), Bernoulli cartridges, and the like. These and other variations are intended to be within the spirit and scope of the present disclosure.

Figure 7:
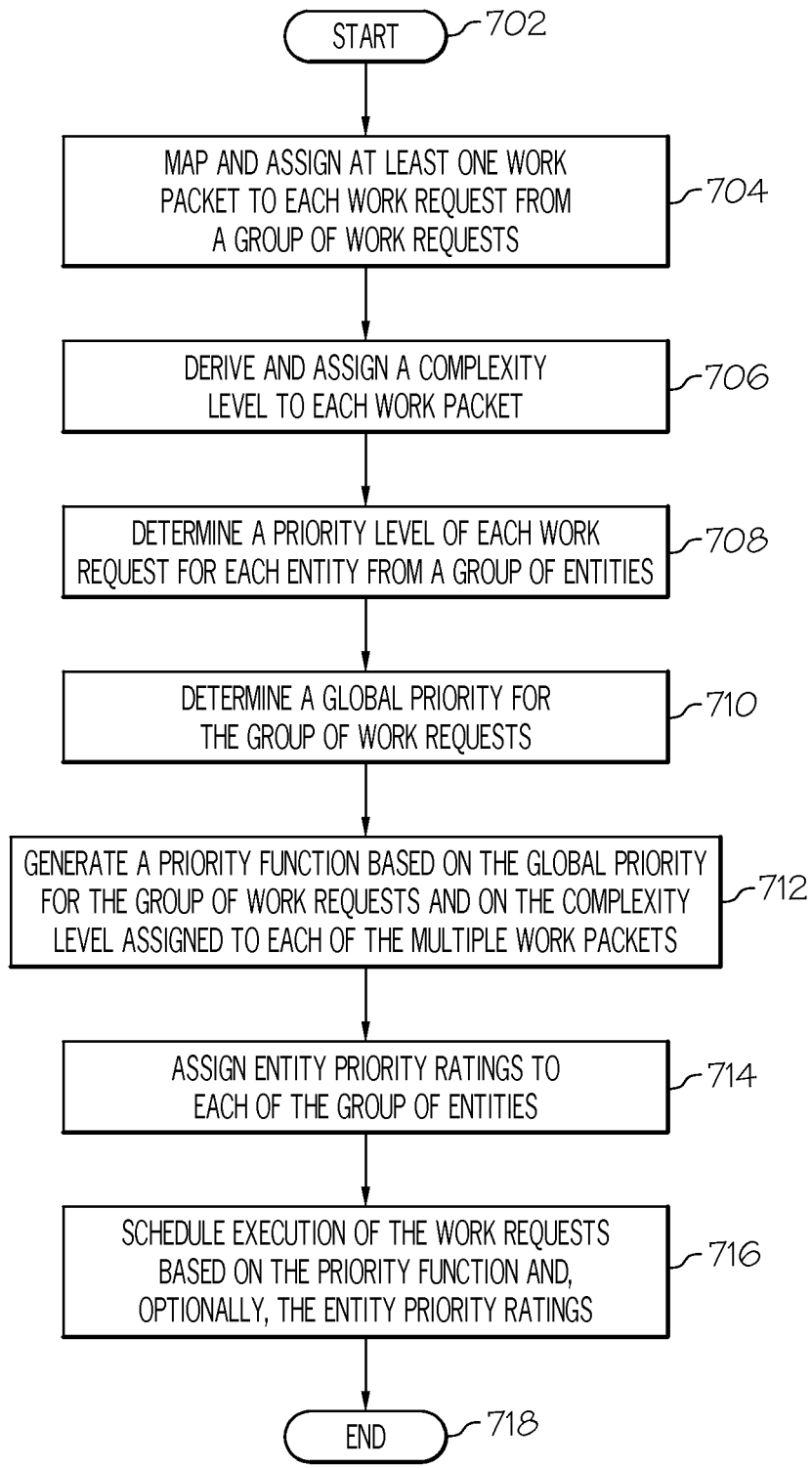
FIG. 7 is a high level flow chart of one or more steps executed by a processor to schedule execution of work requests through work plan prioritization.

Referring now to FIG. 7, a high level flow chart of one or more exemplary steps taken by a processor to schedule execution of work requests through work plan prioritization is presented. After initiator block 702, which may be prompted by one or more work requests being submitted to a factory, one or more work packets are mapped to and assigned to each work request from a group of work requests (block 704). For example, as shown above in Table 1, work packets WP1 and WP2 are assigned to work request RO1, work packets WP1 and WP3 are assigned to work request RO2, and work packet WP2 is assigned to work request RO3. As described in block 706, a complexity level is derived for and assigned to each work packet. In the example shown in Table 1, work packet WP1 is assigned a complexity level of high (H), while the work packet WP2 is assigned a complexity of low (L), and the work packet WP3 is assigned a complexity level of high (H). These complexity levels are derived from an initial estimate for a duration of time, a number of resources, and resource skill requirements required for completing each work packet. For example, if work packet WP1 is predicted to take a long time to complete using many highly skilled resources (e.g., workers), then it receives a high complexity rating/level (H). Conversely, work packet WP2 will not take long to execute and/or will require only a few semi-skilled workers, thus it receives the low complexity rating/level (L).

As depicted in block 708, a priority level of each work request is determined for each entity from a group of entities. Each priority level describes how urgent execution of a specific work request is to a particular entity from the group of entities. In the example shown in Table 1, the entity labeled "Customer" urgently needs work request RO1 to be completed in order to create a finished product. For example, if the finished product is a component of a larger project, then the "Customer" may have an urgent need for the finished product in order to complete the larger project. Thus, work request RO1 has a "high" priority level from the point of view of "Customer". However, the "Factory" in which the work request will be executed and the "Deliver Organization" that will broker/deliver the finished product do not consider work request RO1 to be a high priority (from their perspective). For example, if the "Factory" has other work requests (e.g., work request RO3) that has a higher priority, or if failing to produce the finished product of work request RO1 will not result in any significant late penalties, etc., then the "Factory" may give work request RO1 a "medium" priority level from its perspective.

With reference now to block 710, a global priority is determined for the group of work requests. This global priority provides a preliminary ranking for ordering execution of the group of work requests. The global priority is determined for the group of work requests by factoring in a resource availability for executing each work request, a cost of executing each work request, a financial profit derived by each entity from the group of entities from executing each work request, and the priority level of each work request for each entity from the group of entities. Thus, in the example shown in Table 1, the global priority may initially rank the work orders such that they are executed in the order of work orders RO1, RO3, and then RO2. However, in one embodiment the final ranking of work order execution sequencing also depends on the complexity levels that have been assigned to the work packets, as described in block 706. Thus, a final priority function, based on the global priority for the group of work requests and the complexity level assigned to each of the multiple work packets, is generated (block 712), and the execution of the work requests is scheduled based on this priority function (block 716). In the example shown in Table 1, work request RO1 is still executed first (as suggested by the global priority determined in block 710). However, work request RO2 moves up to second place for execution scheduling, since the work packets (WP1 and WP3) that make up the work packet RO2 are both highly complex, indicating that additional time will be needed to complete the execution of work request RO2.

In one embodiment, the priority function derived in block 712 can be derived by minimizing y* in the formula $$y^* = \underset{c_l(y) \geq 0}{\operatorname{argmin}} \sum_l W(y_l, p_l, s_l) U(C(y_l) - D_l),$$

where $W(\ )$ represents the priority function, $y_l$ is a decision vector for execution of each $l^{th}$ work item, $p_l$ is a set of weighted priorities for the group of entities for each $l^{th}$ work item, $s_l$ is a set of skills required for execution of each $l^{th}$ work item, $C$ is the completion time for execution of each $l^{th}$ work item, and $D_l$ is the deadline of each $l^{th}$ work item.

In one embodiment, the group of entities in Table 1 that are associated with a product may include a producer of a product (e.g., a factory), a distributor of the product (e.g., a broker and/or shipper of the product), and a customer for the product (e.g., an end user/purchaser/orderer/etc.). In one embodiment, the product is software application development and maintenance, such that the producer is a software factory that utilizes pooled resources (as described above in the description of a software factory). In this embodiment, execution of the software application development and maintenance in the software factory is prioritized based on the priority function set above.

With reference now to block 714, in one embodiment of the present disclosure the ordering (scheduling) of execution of work requests is further based on entity priority ratings that describe relative preeminence rankings to each of the group of entities. For example, a customer may be given a higher entity priority rating than a factory or delivery organization. Thus, a customer assigning a "Medium" priority level to a work request (e.g., work request RO3 shown in Table 1) may "trump" the "High" priority level for that work request, thus causing work request RO3 to be executed before work request RO2 (block 716). Alternatively, these entity priority ratings may be ignored when scheduling execution of the work requests, such that the priority levels of each of the work requests are independent of the entity priority ratings.

The process ends at terminator block 718.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer implemented method for scheduling execution of work requests through work plan prioritization, the computer implemented method comprising:
   a processor mapping and assigning at least one work packet to each work request from a group of work requests;
   the processor deriving and assigning a complexity level to each work packet from said at least one work packet, wherein the complexity level is derived from an initial estimate for a duration of time, a number of resources, and resource skill requirements required for completing each work packet from said at least one work packet;
   the processor determining a priority level of each work request for each entity from a group of entities, wherein each priority level describes how urgent execution of a specific work request is to a particular entity from the group of entities;
   the processor determining a global priority for the group of work requests, wherein the global priority provides a preliminary ranking for ordering execution of the group of work requests, and wherein the global priority is determined for said group of work requests by factoring in a resource availability for executing each work request, a cost of executing each work request, a financial profit derived by each entity from the group of entities from executing each work request, and the priority level of each work request for each entity from the group of entities;
   the processor generating a priority function based on the global priority for the group of work requests and the complexity level assigned to each of the multiple work packets, wherein the priority function is derived by minimizing y* in the formula $$y^* = \underset{c_i(y) \geq 0}{\operatorname{argmin}} \sum_l W(y_l, p_l, s_l) U(C(y_l) - D_l)$$

wherein W( ) represents the priority function, $y_l$ is a decision vector for execution of each $l^{th}$ work item, $p_l$ is a set of weighted priorities for the group of entities for each $l^{th}$ work item, $s_l$ is a set of skills required for execution of each $l^{th}$ work item, C is the completion time for execution of each $l^{th}$ work item, and $D_l$ is the deadline of each $l^{th}$ work item; and
   the processor scheduling execution of the work requests based on the priority function.

2. The computer implemented method of claim 1, wherein the group of entities comprises a producer of a product, a distributor of the product, and a customer for the product.

3. The computer implemented method of claim 1, further comprising:
   the processor assigning entity priority ratings to the multiple entities, wherein the entity priority ratings describe relative preeminence rankings to each of the multiple entities.

4. The computer implemented method of claim 3, further comprising:
   the processor further scheduling execution of the work requests based on the entity priority ratings.

5. The computer implemented method of claim 3, wherein the priority levels of each of the work requests are independent of the entity priority ratings.

6. A computer program product for scheduling execution of work requests through work plan prioritization, the computer program product comprising:
   a non-transitory computer readable storage media;
   first program instructions to map and assign at least one work packet to each work request from a group of work requests;
   second program instructions to derive and assign a complexity level to each work packet from said at least one work packet, wherein the complexity level is derived from an initial estimate for a duration of time, a number of resources, and resource skill requirements required for completing each work packet from said at least one work packet;
   third program instructions to determine a priority level of each work request for each entity from a group of entities, wherein each priority level describes how urgent execution of a specific work request is to a particular entity from the group of entities;
   fourth program instructions to determine a global priority for the group of work requests, wherein the global priority provides a preliminary ranking for ordering execution of the group of work requests, and wherein the global priority is determined for said group of work requests by factoring in a resource availability for executing each work request, a cost of executing each work request, a financial profit derived by each entity from the group of entities from executing each work request, and the priority level of each work request for each entity from the group of entities;

fifth program instructions to generate a priority function based on the global priority for the group of work requests and the complexity level assigned to each of the multiple work packets, wherein the priority function is derived by minimizing y* in the formula $$y^* = \underset{c_i(y) \geq 0}{\operatorname{argmin}} \sum_l W(y_l, p_l, s_l) U(C(y_l) - D_l)$$

wherein W( ) represents the priority function, $y_l$ is a decision vector for execution of each $l^{th}$ work item, $p_l$ is a set of weighted priorities for the group of entities for each $l^{th}$ work item, $s_1$ is a set of skills required for execution of each $l^{th}$ work item, C is the completion time for execution of each $l^{th}$ work item, and $D_l$ is the deadline of each $l^{th}$ work item; and sixth program instructions to schedule execution of the work requests based on the priority function; and wherein the first, second, third, fourth, fifth, and sixth program instructions are stored on the non-transitory computer readable storage media.

7. The computer program product of claim 6, wherein the group of entities comprises a producer of a product, a distributor of the product, and a customer for the product.

8. The computer program product of claim 6, further comprising:

seventh program instructions to assign entity priority ratings to the multiple entities, wherein the entity priority ratings describe relative preeminence rankings to each of the group of entities, and wherein the seventh program instructions are stored on the non-transitory computer readable storage media.

9. The computer program product of claim 8, further comprising:

eighth program instructions to further schedule execution of the work requests based on the entity priority ratings, wherein the eighth program instructions are stored on the non-transitory computer readable storage media.

10. The computer program product of claim 8, wherein the priority levels of each of the work requests are independent of the entity priority ratings.

11. A computer system comprising:

a central processing unit (CPU), a computer readable memory, and a computer readable storage media;

first program instructions to map and assign at least one work packet to each work request from a group of work requests;

second program instructions to derive and assign a complexity level to each work packet from said at least one work packet, wherein the complexity level is derived from an initial estimate for a duration of time, a number of resources, and resource skill requirements required for completing each work packet from said at least one work packet;

third program instructions to determine a priority level of each work request for each entity from a group of entities, wherein each priority level describes how urgent execution of a specific work request is to a particular entity from the group of entities;

fourth program instructions to determine a global priority for the group of work requests, wherein the global priority provides a preliminary ranking for ordering execution of the group of work requests, and wherein the global priority is determined for said group of work requests by factoring in a resource availability for executing each work request, a cost of executing each work request, a financial profit derived by each entity from the group of entities from executing each work request, and the priority level of each work request for each entity from the group of entities;

fifth program instructions to generate a priority function based on the global priority for the group of work requests and the complexity level assigned to each of the multiple work packets, wherein the priority function is derived by minimizing y* in the formula $$y^* = \underset{c_i(y) \geq 0}{\operatorname{argmin}} \sum_l W(y_l, p_l, s_l) U(C(y_l) - D_l)$$

wherein W( ) represents the priority function, $y_l$ is a decision vector for execution of each $l^{th}$ work item, $p_l$ is a set of weighted priorities for the group of entities for each $l^{th}$ work item, $s_l$ is a set of skills required for execution of each $l^{th}$ work item, C is the completion time for execution of each $l^{th}$ work item, and $D_l$ is the deadline of each $l^{th}$ work item; and sixth program instructions to schedule execution of the work requests based on the priority function; and wherein the first, second, third, fourth, fifth, and sixth program instructions are stored on the computer readable storage media for execution by the CPU via the computer readable memory.

12. The computer system of claim 11, wherein the group of entities comprises a producer of a product, a distributor of the product, and a customer for the product.

13. The computer system of claim 11, further comprising:

seventh program instructions to assign entity priority ratings to the multiple entities, wherein the entity priority ratings describe relative preeminence rankings to each of the group of entities, and wherein the seventh program instructions are stored on the computer readable storage media for execution by the CPU via the computer readable memory.

14. The computer system of claim 13, further comprising:

eighth program instructions to further schedule execution of the work requests based on the entity priority ratings, wherein the eighth program instructions are stored on the computer readable storage media for execution by the CPU via the computer readable memory.

\* \* \* \* \*